United States Patent [19]
Boscacci

[11] Patent Number: 4,613,109
[45] Date of Patent: Sep. 23, 1986

[54] APPLIANCE SECURITY DEVICE

[75] Inventor: William L. Boscacci, San Leandro, Calif.

[73] Assignee: Lucasey Manufacturing Company, Oakland, Calif.

[21] Appl. No.: 591,012

[22] Filed: Mar. 19, 1984

[51] Int. Cl.[4] .......... F16M 13/00
[52] U.S. Cl. .......... 248/553; 70/167; 248/298; 248/657; 248/670
[58] Field of Search .......... 248/553, 551, 552, 657, 248/670, 149, 155.3, 244, 295.1, 297.2, 298, 307, 678, 205.3, 205.4; 70/78, 163, 167, 168

[56] References Cited

U.S. PATENT DOCUMENTS

| | | | |
|---|---|---|---|
| 2,486,032 | 10/1949 | Jimenez | 248/552 |
| 2,498,392 | 2/1950 | Boyle | 248/657 |
| 3,652,044 | 3/1972 | Manross | 248/657 |
| 3,850,392 | 11/1974 | Gassaway | 248/678 |
| 3,934,829 | 1/1976 | Coucher | 248/657 |

*Primary Examiner*—Ramon O. Ramirez
*Attorney, Agent, or Firm*—Niro, Scavone, Haller & Niro, Ltd.

[57] ABSTRACT

A security device for mounting an appliance on a support surface including a bracket assembly having separable base and cover sections defining a substantially closed compartment when joined. A lock is provided for securing the joined bracket sections. Adhesive pad is adhered to the support surface and an interengaging loop is provided between the adhesive pad and the base section. The base and cover sections are joined in a sliding fashion generally parallel to the support surface.

21 Claims, 4 Drawing Figures

APPLIANCE SECURITY DEVICE

BACKGROUND OF THE INVENTION

This invention relates to devices for securing appliances such as office equipment to their mounting support surfaces.

Many institutions such as businesses, schools, hotels and the like utilize a large number of appliances or equipment such as typewriters, word processors, computers, television sets and other equipment which are prone to theft problems. While such appliances often are relatively expensive, it is not usually practical to always maintain all of the areas where the appliances are located under constant and close surveillance. For this reason such appliances have become a target for theft.

One common method of reducing the loss of such equipment has been to bolt the equipment to the surface to which it is mounted. This often is accomplished by utilizing a mounting bracket which includes a locked cover which conceals the bolt or stud and/or nut so that they are concealed and cannot be easily removed.

Examples of such security devices are disclosed in U.S. Pat. Nos. 3,724,798 and 3,850,392. U.S. Pat. No. 3,724,798 is assigned to the assignee of this invention and shows the use of a bracket structure which includes first and second sections defining a substantially closed compartment when joined and which conceals the fastening means of the device. The first section forms a closure with the second section. The first section is secured to a support means and the second section constitutes a supporting platform for the appliance and securable to the same by removable fasteners enclosed and concealed within the compartment. U.S. Pat. No. 3,850,392 also shows a bracket assembly which includes a cover section forming a substantially closed compartment. The cover section is attached to an adhesive pad secured directly to the supporting surface. The adhesive pad is used to avoid drilling holes into the support surface for receiving bolts which attach the device to the support surface.

One of the problems with using adhesive pads for attaching security devices to their support surfaces is in the cost of manufacturing the devices. In many institutions, such as schools, where a large number of appliances are utilized, the cost of security devices can be prohibitive. Consequently, such institutions choose to bolt the security devices directly to their support surfaces because there is little or no intention of moving the appliances to other locations.

On the other hand, in some businesses where the support surfaces comprise the top of relatively expensive furniture, there is a desire to utilize adhesive pads which do not permanently damage the furniture.

There is a definite need for a new and improved security device which can be readily and easily converted from a device which is secured directly to a support surface, as by bolts or the like, to a device which can utilize adhesive pads as the fastening means. This would permit the manufacturer to market a relatively inexpensive security device, and yet permit the device to be converted to an adhesive-type device if desired.

Another problem with security devices of the character described resides in the method of assembly and disassembly of the bracket structure which forms the closed interior compartment of the bracket. With prior devices such as those disclosed in both U.S. patents described above, the cover section of the bracket is assembled and disassembled from the base section in a generally vertical direction; i.e. generally perpendicular to the support surface. In some institutions, such as hospitals or the like, monitoring equipment and other appliances are stored in vertical fashion for ready accessibility somewhat akin to a chest of drawers. There is a need and it would be desirable to provide a new and improved security device of the character described wherein the cover section of the bracket assembly is assembled to the base section in a sliding fashion and yet provide a substantially closed compartment when joined.

This invention is directed to solving the problems and satisfying the needs described above.

SUMMARY OF THE INVENTION

An object, therefore, of the invention is to provide a new and improved security device for mounting an appliance on a support surface.

Another object of the invention is to provide a security device of the character described which can be fastened directly to a support surface by bolt means or the like, the device being readily convertible to one that can be attached to the support surface by adhesive pad means if desired.

A further object of the invention is to provide a security device of the character described which includes a bracket assembly having base and cover sections defining a substantially closed compartment when joined, the base and cover sections being assembled in a sliding fashion generally parallel to the support surface.

In the exemplary embodiment of the invention, the security device includes a bracket assembly having separable base and cover sections defining a substantially closed compartment when joined. The cover section constitutes a supporting platform for the appliance and is securable to the appliance by appropriate fasteners which are enclosed and concealed within the compartment when the sections are joined. Lock means is provided for releasably locking the joined bracket sections. Adhesive pad means is adapted to be adhered to the support surface. Interengaging means is provided between the adhesive pad means and the base section and exposed only within the closed compartment to releasably secure the base section to the adhesive pad means. Means is provided on the base section for facilitating securing the base section directly to the support surface independently of the adhesive pad means by means enclosed and concealed within the compartment. Thus, the security device can be attached directly to a support surface by appropriate fasteners such as bolts, the device being readily convertible to one which can be attached to the support surface by the adhesive pad means.

To this end, the interengaging means between the adhesive pad means and the base section comprise aperture means in the base section, loop means on the adhesive pad means for projecting through the aperture means, and pin means dimensioned to fit through the loop means. In the preferred embodiment, the adhesive pad means comprise one or more plate members having an adhesive layer bonded to the bottom surface thereof, with the loop means fixed to the top surface of the plate member.

Another feature of the invention is the provision of a bracket assembly wherein the base and cover sections are joined in a sliding fashion generally parallel to the support surface. More particularly, the bracket assembly disclosed herein includes a base section having a base wall and an open front defined by a rear wall and opposite side walls extending upwardly from the base wall. The cover section includes a top wall with a front wall extending downwardly therefrom to close the open front of the base section and define the closed compartment. The cover section is dimensioned to slide through the open front of the base section between the side walls thereof. The lock means is disposed between the front wall of the cover section and the base wall of the base section.

Other objects, features amd advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and advantages thereof, may be best understood by reference to the following description taken in conjunction with the accompanying drawings, in which like reference numerals identify like elements in the figures and in which:

FIG. 4 is a somewhat schematic elevational view illustrating the utilization of a plurality of security devices in a stacked array for accommodating a plurality of appliances.

DETAILED DESCRIPTION OF THE PREFERRED EMBODIMENT

Figure 1:
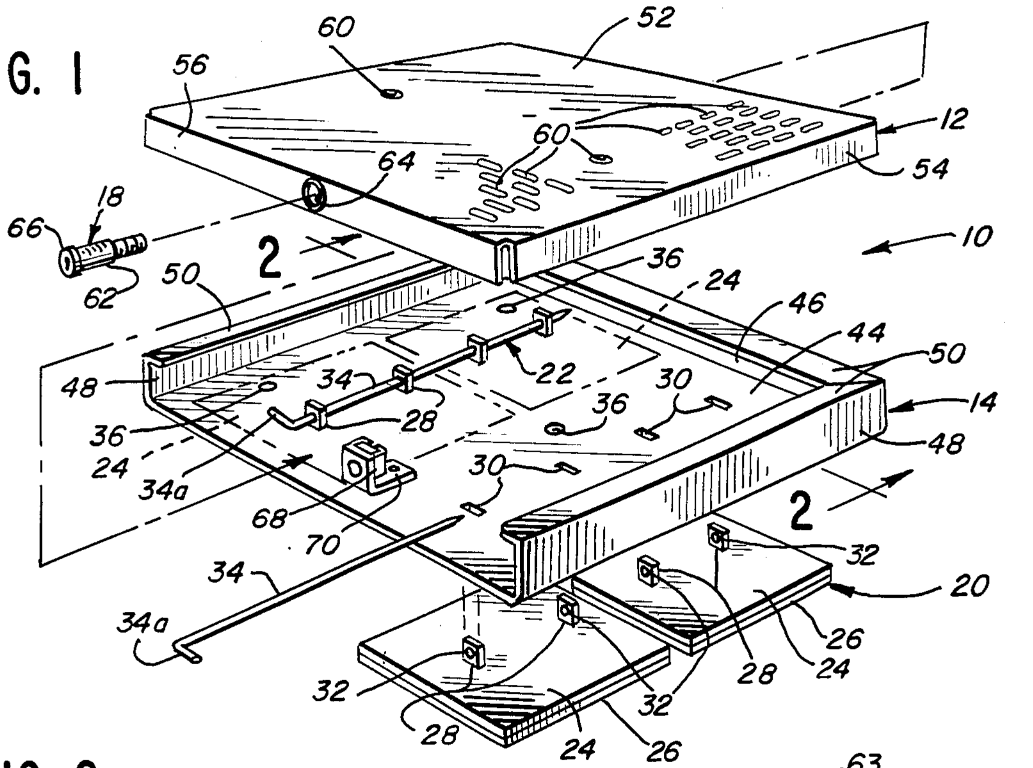
FIG. 1 is an exploded perspective view illustrating the various components of a security device incorporating the features of this invention.

Referring to the drawings in greater detail, and first to FIG. 1, a security device, generally designated 10, is illustrated for mounting an appliance on a support surface. As will be apparent from the following description, the device can be employed for attachment directly to a support surface, as by bolts or the like, the device being readily convertible to one which is attachable to the support surface by adhesive pad means.

More particularly, security device 10 comprises a bracket assembly which includes separable and independent cover and base sections, generally designated 12 and 14, respectively. The base and cover sections together define a substantially closed compartment 16 (FIG. 2) when joined. Cover section 12 constitutes a supporting platform for an appliance or other equipment item and is securable to the appliance by appropriate securing means including, but not limited to, fasteners (not shown) which are enclosed and concealed within the compartment when the sections are joined. Lock means, generally designated 18, is provided for releasably locking the joined bracket sections 12, 14.

Security device 10 also includes adhesive pad means, generally designated 20, adapted to be adhered to a support surface. Interengaging means, generally designated 22, is provided between adhesive pad means 20 and base section 14 to releasably secure the base section to the adhesive pad means from within the closed compartment defined by the base and cover sections. Means described hereinafter also is provided on base section 14 or securing the base section directly to a support surface independently of adhesive pad means 20.

Figure 2:
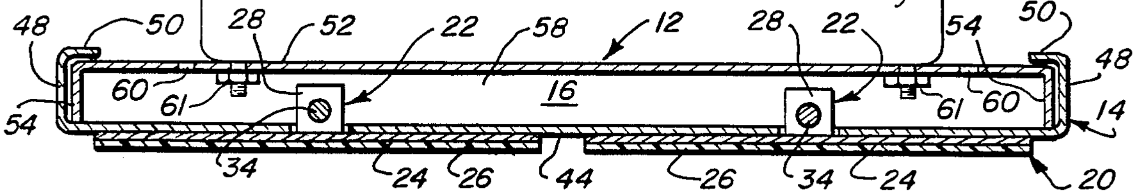
FIG. 2 is a vertical section, on an enlarged scale, taken generally along line 2—2 of FIG. 1 and illustrating the device completely assembled.
Figure 2:
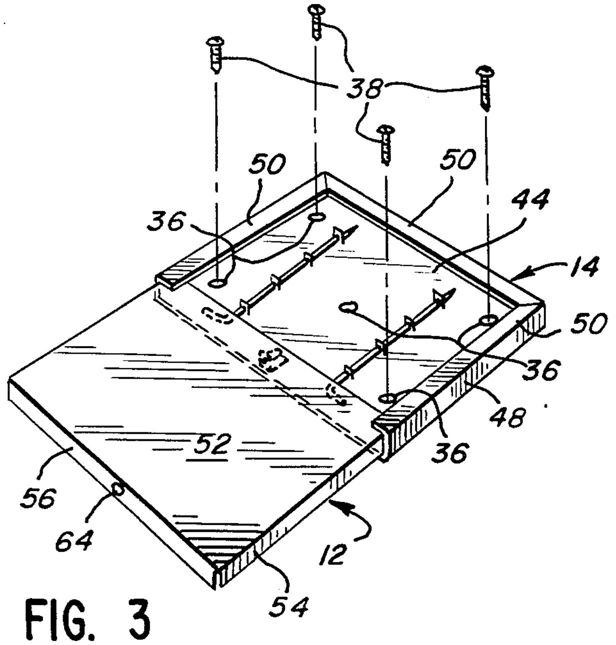

Referring to both FIGS. 1 and 2, adhesive pad means 20 comprise four plate members 24 having an adhesive layer 26 bonded to the bottom surface thereof. Thus, it can be seen that the adhesive pad means is totally independent of base section 14 which combines with top section 12 for forming the bracket assembly for the appliance accordingly, the base section 14 or the combination of the base section 14 and top section 12 are movable with respect to the interengaging means.

The interengaging means between adhesive pad means 20 and base section 14 comprise a plurality of loops 28 formed integral with and projecting upwardly from plate members 24. The loops project through apertures 30 in base section 14. The loops have holes 32 which are aligned for receiving pins 34 dimensioned to fit through the holes in the loops to releasably interengage the adhesive pads with the base section such that the pads are disposed on the underside thereof. Pins 34 have angled portions 34*a* at the outer ends thereof to facilitate manual manipulation of the pins to thread the pins through the loops of the adhesive pads from within base section 14 as illustrated in FIG. 1. It can be seen in FIG. 2 that the interengaging means 22 described above is concealed within closed compartment 16 between base section 14 and cover section 12.

Figure 3:
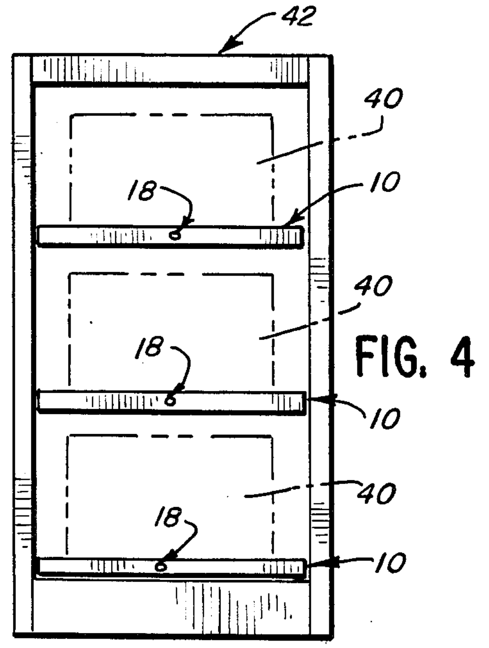
FIG. 3 is a perspective view, on a reduced scale, of the security device and illustrating the sliding relationship of the bracket assembly sections.

Referring to FIGS. 1 and 3, means is provided for securing base section 14 directly to a support surface totally independently of adhesive pad means 20. More particularly, the base section is provided with a plurality of apertures 36 through which a pluraility of bolts or screws 38 (FIG. 3) pass to secure the base section directly to a support surface, such as the top of a table or desk. As stated hereinbefore, adhesive pad means 20 can be relatively expensive to manufacture and may be prohibitive cost-wise for some institutions, such as schools. Thus, it can be seen that a complete security device comprising the basic components of cover section 12 and base section 14 can be employed totally independently of the adhesive pad means. If an institution desires to avoid permanent installation of the security device, as by forming holes in a support surface for receiving screws 38, adhesive pad means 20 can be employed as a separate, releasable interengaging securing means in combination with base section 14. In fact, it is contemplated that adhesive pad means 20, including pins 34, can be manufactured and sold as separate convertible kits for use with the bracket assembly comprising cover and base sections 12 and 14, respectively.

Another feature of the invention is illustrated in all of FIGS. 1–4 and comprises the sliding manner in which cover and base sections 12 and 14, respectively, are joined. Heretofore, such bracket assemblies have been joined in various fashions requiring vertical assembly procedures. With the bracket assembly herein, the cover and base sections are joined in a sliding manner generally parallel to a support surface. For instance, FIG. 4 schematically illustrates three security devices 10 for supporting three appliances 40 in a vertical or stacked array within an enclosed cabinet, generaly designated 42. This is appropriate for such institutions as hospitals where monitoring equipment is so stored for ready access and use.

More particularly, referring to FIGS. 1-3, base section 14 includes a base wall 44 (wherein apertures 30 and 36 are formed), a rear wall 46 and opposite side walls 48. The rear and side walls terminate at their upper edges in inwardly turned flange means 50 for guiding cover section 12 as described hereinunder. As seen best in FIGS. 1 and 3, this construction of base section 14 forms an open front thereto.

Cover section 12 includes a top wall 52, side walls 54, a front wall 56 and a rear wall 58 (FIG. 2). As best seen in FIGS. 2 and 3, cover section 12 is dimensioned to slide through the open front of base section 14 between side walls 48 of the base section and beneath the inwardly turned flanges means 50. Top wall 52 has apertures 60 (FIG. 1) for securing the cover section to an appliance by appropriate fasteners such as, for example, fasteners 61 in FIG. 2 which are protruding from the bottom of an appliance, such as equipment 63 and extending beneath the cover section and, thus, concealed within the closed compartment of the bracket assembly.

As can best be seen in FIG. 1, the locking means 18 is provided for securing cover and base sections 12 and 14, respectively in joined condition and is effectively disposed between front wall 56 of the cover section and base wall 44 of the base section. More particularly, a key operated lock 62 extends through a hole 64 in front wall 56 of the cover section, the lock having a head portion 66 for abutting against the front wall. The key operated lock engages a lock receiver assembly 68 attached to an upstanding leg of an L-shaped bracket 70 fixed to the top of base wall 44 of base section 14. When the cover and base sections are fully joined in their sliding relationship, lock 62 is inserted through bore 64 and a key is engaged within the lock to secure the lock to lock receiver 68 on the base section.

Thus, it can be seen that a new and improved security device 10 has been provided which is convertible between a device having a bracket assembly comprising cover section 12 and base section 14 securable directly to a support surface, as well as device wherein the bracket assembly can be independently secured to the support surface by adhesive pad means releasably interengageable with the bracket assembly. Cover section 12 is slidably joined with base section 14 to permit the bracket assembly to be assembled in a horizontal fashion for accommodating appliances in a vertical array.

It will be understood that the invention may be embodied in other specific forms without departing from the spirit or central characteristics thereof. The present examples and embodiments, therefore, are to be considered in all respects as illustrative and not restrictive, and the invention is not be be limited to th details given herein.

What is claimed is:

1. A security device for mounting an appliance on a support surface comprising:

a bracket assembly including a first base section and a second separate, independent cover section, which together define a substantially closed compartment when joined, said second cover section constituting a supporting platform for said appliance and securable to the appliance by appropriate fasteners which are enclosed and concealed within said compartment when said first base section is joined with said second cover section;

lock means for relesably locking said first base section with said second cover section;

adhesive pad means adapted to be adhered to said support surface;

interengaging means disposed between said adhesive pad means and said first base section, at least one of said first base section and the combination of said first base section and said second cover section movable with respect to said interengaging means, said interengaging means exposed only within said closed compartment to releasably secure the base section to the adhesive pad means; and means on said first base section for facilitating securing the base section directly to the support surface independently and without use of adhesive pad means by means enclosed and concealed within said compartment.

2. The security device of claim 1 wherein said interengaging means comprise aperture means in said base section, loop means on said adhesive pad means for projecting through said aperture means, and pin means dimensioned to fit through said loop means.

3. The security device of claim 2 wherein said adhesive pad means comprise a plate member having an adhesive layer attached to the bottom surface thereof, with said loop means fixed to the top surface of said plate member.

4. The security device of claim 3 wherein said base section includes a base wall with said aperture means therein.

5. The security device of claim 1 wherein said base section includes a base wall and an open front defined by a rear wall and opposite side walls extending upwardly from the base wall, and said cover section includes a top wall with a front wall extending downwardly therefrom to close said open front and define said compartment.

6. The security device of claim 5 wherein said cover section is dimensioned to slide through the open front of the base section between the side walls thereof.

7. The security device of claim 6 wherein said upwardly extending side walls of the base section terminate in inwardly turned flange means to guide the cover section into the base section.

8. The security device of claim 5 wherein said lock means is disposed between the front wall of the cover section and the base wall of the base section.

9. The security device of claim 1 wherein said base section includes means defining an open front therefor, and said cover section is dimensioned to slide into and out of the open front of the base section.

10. A security device for mounting an appliance on a support surface, comprising:

a bracket assembly including separable base and cover sections, said cover section defining a support securable to the appliance by appropriate fasteners;

adhesive pad means adapted to be adhered to said support surface;

interengaging means between said adhesive pad means and said base section to releasably secure the base section to the adhesive pad means, at least one of said base section and the combination of said base section and said cover section being movable with respect to at least one of said adhesive pad means and said interengaging means; and means on said base section for facilitating securing the base section directly to the support surface independently of the adhesive pad means.

11. The security device of claim 10 wherein said interengaging means comprise aperture means in said base section, loop means on said adhesive pad means for projecting through said aperture means, and pin means dimensioned to fit through said loop means.

12. The security device of claim 11 wherein said adhesive pad means comprise a plate member having an adhesive layer attached to the bottom surface thereof, with said loop means fixed to the top surface of said plate member.

13. The security device of claim 12 wherein said base section includes a base wall with said aperture means therein.

14. A security device for mounting an appliance on a support surface comprising:

a base section having associated first securing means for securing said base section to said support surface;

a cover section having associated second securing means for securing said appliance to said cover section;

interengaging means between said first securing means and said base section for releasably securing said base section to said first securing means;

a complementary interengaging slide housing formed by said base section and said cover section with said cover section manually slidable in a direction generally parallel to said support surface, said slide housing defining a closed compartment having controlled accessibility thereto and further enclosing and concealing said interengaging means and second securing means in said compartment; and lock means for releasably joining said base and cover sections when fully engaged to form said closed compartment with the joining of said base and cover sections creating limited access to release said cover section from said base section.

15. The security device of claim 14 wherein said base section includes a base wall and an open front defined by a rear wall and opposite side walls extending upwardly from the base wall, and said cover section includes a top wall with a front wall extending downwardly therefrom to close said open front and define said compartment.

16. The security device of claim 15 wherein said cover section is dimensioned to slide through the open front of the base section between the side walls thereof.

17. The security device of claim 16 wherein said upwardly extending side walls of the base section terminate in inwardly turned flange means to guide the cover section into the base section.

18. The security device of claim 15 wherein said lock means is disposed between the front wall of the cover section and the base wall of the base section.

19. A security device for mounting an appliance on a support surface, comprising:

a bracket assembly including separable base and cover sections defining a substantially closed compartment when joined, said base section including a base wall and an open front defined by a rear wall and opposite side walls extending upwardly from the base wall, said cover section constituting a supporting platform for said appliance and securable to the appliance by appropriate fasteners which are enclosed and concealed within said compartment when the sections are joined, said cover section including a top wall with a front wall extending downwardly therefrom to close said open front and dimensioned to slide through the open front of the base section between the side walls thereof, thereby defining said compartment;

lock means for releasably locking the joined bracket sections;

adhesive pad means adapted to be adhered to said support surface;

interengaging means between said adhesive pad and said base section and exposed only within said compartment to releasably secure the base section to the adhesive pad means; and means on said base section for facilitating securing the base section directly to the support surface independently of said adhesive pad means by means enclosed and concealed within said compartment.

20. The security device of claim 19 wherein said upwardly extending side walls of the base section terminate in inwardly turned flange means to guide the cover section into the base section.

21. A security device for mounting an appliance on a support surface, comprising:

a bracket assembly including separable base and cover sections defining a substantially closed compartment when joined, said base section including means defining an open front therefore, said cover section dimensioned to slide into and out of the open front of the base section and providing a supporting platform for said appliance and securable to the appliance by appropriate fasteners which are enclosed and concealed within said compartment when said sections are joined;

lock means for releasably locking the joined bracket sections;

adhesive pad means adapted to adhered to said support surface;

interengaging means between said adhesive pad means and said base section and exposed only within said closed compartment to releasably secure the base section to the adhesive pad means; and means on said base section for facilitating securing the base section directly to the support surface independently of said adhesive pad means by means enclosed and concealed within said compartment.

* * * * *